United States Patent [19]

Jaeger

[11] 4,332,352

[45] Jun. 1, 1982

[54] MULTISTAGE THERMOSTAT USING INTEGRAL INITIATION CHANGE MEANS

[75] Inventor: Thomas S. Jaeger, Minneapolis, Minn.

[73] Assignee: Honeywell Inc., Minneapolis, Minn.

[21] Appl. No.: 229,690

[22] Filed: Jan. 30, 1981

[51] Int. Cl.³ .................. G05D 23/12; F23N 5/20; F25B 29/00

[52] U.S. Cl. .................. 236/1 E; 236/46 R; 165/29

[58] Field of Search .............. 236/1 ER, 1 EA, 1 EB, 236/46 R, 47, 78 D, 46 F; 165/12, 29, 26

[56] References Cited

U.S. PATENT DOCUMENTS

| | | | |
|---|---|---|---|
| 3,834,617 | 9/1974 | Dyntar | 236/46 R |
| 4,265,298 | 5/1981 | Sumner, Jr. et al. | 165/29 |
| 4,265,299 | 5/1981 | Harnish | 165/29 |
| 4,270,693 | 6/1981 | Hayes | 236/46 F |

*Primary Examiner*—Lloyd L. King
*Assistant Examiner*—Harry Tanner
*Attorney, Agent, or Firm*—Alfred N. Feldman

[57] ABSTRACT

A multistage thermostat is operated by comparing the thermostat setpoint and the sensed temperature over a continuous series of discrete intervals of time. When a sudden change occurs between the sensed temperature and the setpoint, the magnitude of this change is evaluated in a comparator means and if necessary the system is reset to compensate for the change to operate in the most efficient manner. The adjustment of a constant supplied to an integrating circuit that forms part of a signal processing circuit means for the thermostat means provides the adjustment when the predetermined level of change is made.

10 Claims, 4 Drawing Figures

MULTISTAGE THERMOSTAT USING INTEGRAL INITIATION CHANGE MEANS

CROSS REFERENCE TO RELATED APPLICATIONS

On even date, an application Ser. No. 229,689 in the name of Ronald Benton is being filed covering an invention directed to a multistage thermostat using integral action which is related to the present application.

BACKGROUND OF THE INVENTION

Multistage heating plants have been in use for many years, and typically are made up of heating equipment that provides heat from two different sources. Examples of such multistage heating plants are plants which include heat pumps with auxiliary electric heat, heat pumps with auxiliary gas furnaces, and solar energy sources with auxiliary heat of either electric or fossil fuels. The reason for using heating plants that have primary and secondary fuel sources is to take advantage of a lower cost heating fuel with the use of the primary source and then utilizing the secondary source which requires a more costly fuel.

In recent years, to increase the cost efficiency of the use of multistage equipment, it has been common to install outside temperature sensing equipment to aid in the staging of the primary and secondary heating plants. As is well known, it is more efficient to provide heat by operating a heat pump than by the use of a secondary heating source such as electric heat. As this is the case, it is desirable to prevent the electric heat from becoming operable if the primary source, the heat pump, can handle the heating load by itself. Where a multistage system is operated at a constant indoor temperature, this creates no significant problem. If the indoor temperature is held constant, the natural variations in outdoor temperature cause the heat pump and its auxiliary heat to be staged in its most efficient manner. That is, the heat pump will supply heat until it is no longer able to maintain a stable temperature and then the auxiliary or electric heat will be brought into operation.

In order to save energy, it has become commonplace to provide a night setback function to many thermostats along with its associated day setup function. These functions provide for a lower nighttime temperature within the heated building, and a morking pickup or return to the normal daytime ambient temperature. Where night setback and morning pickup are provided, a heat pump may not be operated in its most efficient mode. For example, in the morning when the thermostat is returned to normal daytime ambient temperature control, the heat pump is turned on along with a number of stages of electric heat. This morning pickup therefore utilizes both the primary and secondary heating sources at the same time regardless of whether or not the heat pump alone might be capable of bringing the temperature of the building up to the setpoint temperature if given sufficient time. In order to prevent this type of a system from having the electric heat staged on at the time of morning pickup, many installations contain offside thermostats which lock the electric heat off if the outdoor ambient is above some predetermined temperature. This type of system is expensive and inefficient. It is expensive from the point of view that it requires an outside temperature sensing device and auxiliary control equipment, along with the loss of efficiency as many installers misadjust the equipment so that electric heat is brought on even though it would not be required to bring the building up to the normal daytime ambient.

This type of system also has a further fault. Many heat pumps must be operated continuously in extremely cold climates to prevent damage to the equipment. If a thermostate in a building is set down at night, say 15 degrees, typically the heat pump and all of its auxiliary heat would be turned off. This is an undesirable condition as the heat pump can be damaged. It is more desirable that on night setback that the heat pump be kept in operation if the outdoor ambient is quite low. This allows the heat pump to be protected by continuous operation, and a small amount of heat from the heat pump is supplied as the ambient temperature within the building drifts down to the night setback temperature. Once again, if this type of protection is to be provided, an outdoor sensor and control equipment must be installed to prevent a night setback from turning off the heat pump even though the indoor thermostat is setback to a point which would not otherwise require the heat pump to be active.

In summary, it is common in the control of heat pumps with auxiliary heat, particularly electric heat, to install outside sensing equipment that overrides any setpoint changes either in setup in the morning or setback at night. The installation of this extra equipment, and the deficiencies in its adjustment, make the operation of heat pump equipment and auxiliary heat marginal in many types of installations. In some localities, the electric utilities supplying power have suggested that heat pump installations be operated without night setback and morning pickup just because of the conditions recited above.

SUMMARY OF THE INVENTION

The present invention is directed to a multistage thermostat that is particularly adapted to operate a heating plant having a primary heating source and a secondary heating source, such as a heat pump with auxiliary heat. While the present invention is applicable to any type of any multistage temperature control where a primary heating source and a secondary heating source are used, it will be specifically described in the context of a multistage thermostat for controlling a heat pump with a plurality of stages of auxiliary electric heat. The reason is that this is the most common type of multistage application for the present invention.

The present invention provides for night setback and morning setup or pickup in a manner that will most efficiently utilize the operation of a heat pump without unnecessarily causing the auxiliary heat to become energized. The present invention accomplishes this mode of operation without any type of outside sensing or field adjustment of outside located equipment.

The present invention utilizes a multistage thermostat that has an internal clock that provides timed control for night setback and morning setup, along with providing a continuous series of timed intervals which are necessary for the functioning of the present invention. The present invention utilizes a multistage thermostat which has an integrating type of control and wherein the integrator used in the control is capable of having a stored integral value adjusted at night setback or morning setup to insure that the heat pump will be operated in a proper manner. The invention further utilizes a means for storing a previous temperature setpoint so that the previous temperature setpoint can be compared periodically, typically at 30 second intervals, with the present setpoint temperature. When a night setback adjustment or a morning setup adjustment occurs, the previous temperature setpoint holding mechanism is compared with the new setpoint and shows that the system has undergone a setpoint change. The amount of the setpoint change is fed into a comparator means that has a plurality of stored constants against which the change is compared. If the change is of a particular magnitude and direction, the stored integral value of the integrator in the system is reset or reinitiated at a different level thereby adjusting the system operation so that proper staging can occur. Proper staging can be defined as bringing on auxiliary heat only when the operation of the heat pump alone will not satisfy the temperature control requirements within a set period of time, and insuring that the heat pump is not turned off if the outdoor ambient is below a predetermined level. These predetermined levels are sensed by comparing the previous setpoint temperature with the new setpoint temperature after a setpoint change has been made. It is quite obvious that if a large difference exists between a previous setpoint temperature and a new setpoint temperature, that a change in control is required. This change reflects the fact that a setpoint change has occurred, and can be correlated with the outdoor temperature. A change made manually is treated the same as a clock made change.

The present integrating type of control, which is reset dependent on a comparison with a previous setpoint temperature versus the present setpoint temperature, is then fed as a continuous composite error signal into a multistage cycler. The multistage cycler is a device which progressively brings on stages of heating. Each stage has a hysteresis control function and by continuously increasing the composite error signal, stages of heating, from the primary through the secondary stages, can be progressively brought on in the most efficient manner.

DESCRIPTION OF THE PREFERRED EMBODIMENT

Figure 1:
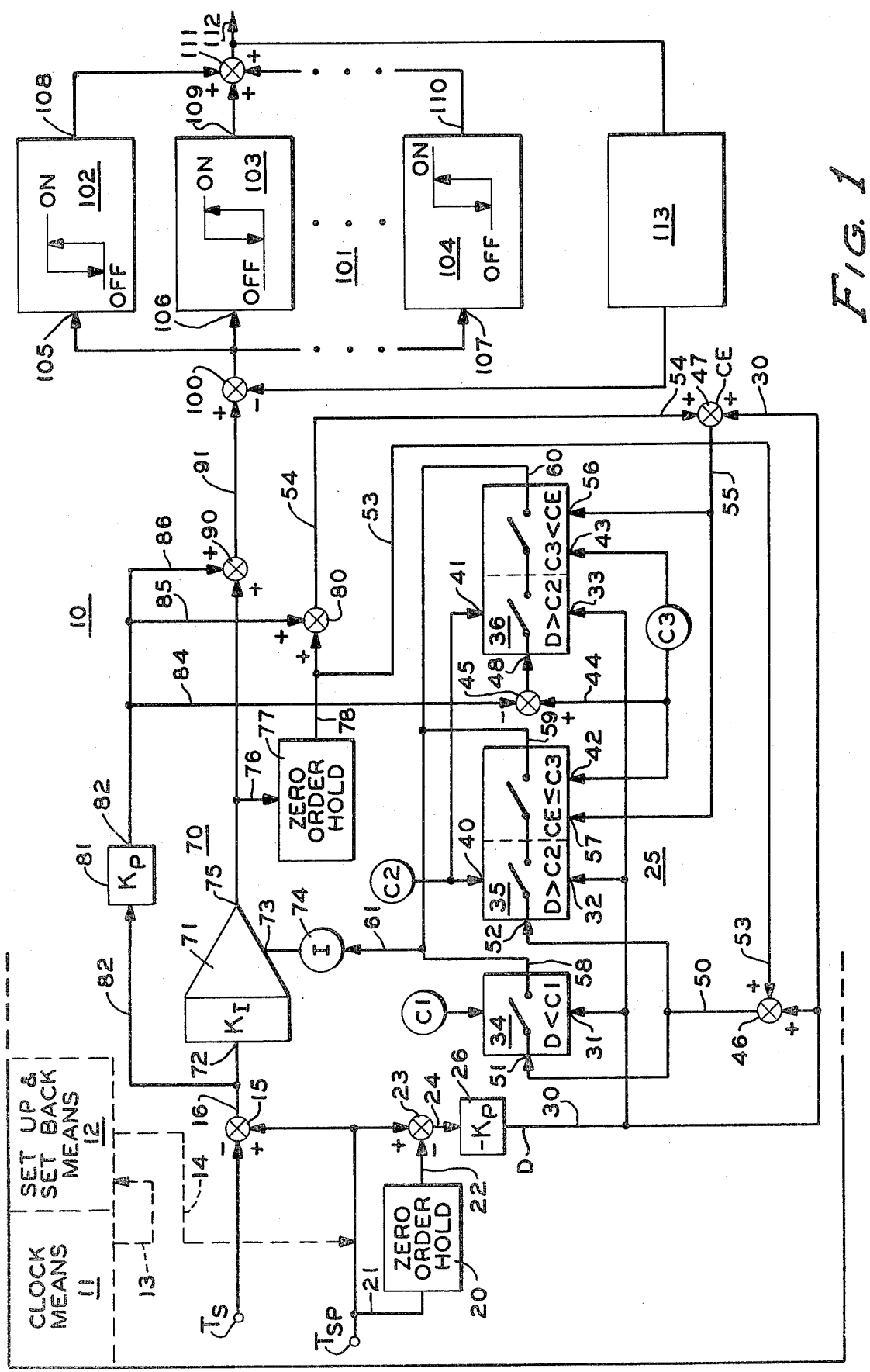
FIG. 1 is a block diagram of a multistage thermostat.

In FIG. 1 there is disclosed a schematic representation of a multistage thermostat generally indicated at 10. While the multistage thermostat 10 of the present invention can be used with many types of heating plants having a primary heating means and a secondary heating means, the present disclosure will refer specifically to a heat pump as the primary heating means and stages of electric heat as the secondary heating means. This type of heating plant readily benefits from a multistage thermostat of the type disclosed in FIG. 1.

The thermostate 10 includes a clock means 11. The clock means 11 can be any type of clock that is capable of providing a continuous series of timed intervals. In the present day technology, the most common type of clock suitable for this application is a crystal controlled oscillator and frequency divider means to provide a series of accurately timed clock pulses. The clock pulses are used in the thermostat 10 for at least two separate and distinct functions. The first function is to supply the multistage thermostat means 10 with a continuous series of timed intervals that are used in the temperature signal processing that takes place within the thermostat means 10, as well as providing for night setback functions and morning setup functions. The night setback function and its accompanying setup function are disclosed generally at 12. This function relies at 13 on a signal from the clock means 11 and provides an output 14 which is used to change a temperature setpoint means Tsp. The setpoint temperature Tsp is the conventional setpoint for a thermostat which can be manually set into the thermostat 10 by adjusting a lever, dialing in a numerical value, or pushing buttons to establish a digital input which in turn establishes a setpoint for the thermostat means 10. In the present discussion, a single setback setpoint change and a single setup or morning pickup change is programmed by means 12 and will be discussed in the description of the operation of the thermostat means 10. The number of setback times and morning pickup or setup times is strictly a function of the design of the thermostat and can vary from the single combination of setback and setup to multiple combinations thereof.

The thermostat means 10 further has an input in the form of a temperature sensing means Ts which provides a signal that is responsive to the ambient temperature to be controlled by the operation of the heat pump and electric heat controlled by the thermostat means 10. The temperature sensing means Ts can be any type of sensing means, but most typically would be a thermistor and bridge arrangement having an output signal at Ts which is representative of the temperature in the ambient being controlled. The temperature sensing means Ts and the variable temperature setpoint means Tsp are summed in a first summing means generally disclosed at 15. The output of the summing means 15 is provided on a conductor 16 and is representative of a current temperature error that exists between the temperature Tsp that is set into the thermostat means 10, and the temperature Ts which is the temperature sensed by the thermostat means 10.

A previous temperature setpoint means 20 is disclosed connected to the variable temperature setpoint means Tsp by means of a conductor 21, and the previous temperature setpoint means 20 has an output 22 that is fed into a second summing means 23 where it is combined with a signal from the variable temperature setpoint means Tsp. The previous temperature setpoint means 20 is any type of electronic means which can be operated with the clock means 11 (by means not shown) so that the previous temperature setpoint means 20 can hold a signal value that represents the output signal from the temperature setpoint means Tsp that occurred at a previous interval of time immediately preceding a current interval of time. A typical device that is capable of performing the function of the previous temperature setpoint means 20 is a device known as a zero order hold circuit which is well known in the technology of systems engineering. This type of a device sometimes is referred to as a holding circuit and is used extensively in digital control systems. The output of the second summing means 23 is a conductor 24 and provides a difference signal between the present setpoint temperature and the setpoint temperature at an interval of time just prior to a sampled interval. In the present thermostat means 10 the sampling interval is in the order of 30 seconds, but the time interval can be any relatively short period of time, as will become apparent when the overall system operation is developed.

The output of the summing means 23 at conductor 24 is provided as an input to a comparator means which is generally disclosed at 25. The comparator means 25 receives the signal on the conductor 24 and inverts that signal in the negative proportional constant means 26 which provides an output signal D. The output signal D is the difference between the present setpoint signal and in the setpoint signal at an interval of time just prior to the present interval of time. This allows the system to recognize a sudden setpoint change, such as a setback in temperature or a setup in temperature, as occurs in means 12 under the control of the clock means 11.

The difference signal D is supplied by a conductor 30 as inputs at 31, 32, and 33 to three individual comparator circuits disclosed at 34, 35, and 36. It will be noted that the comparators 35 and 36 are disclosed as having two series connected sections. The comparators 35 and 36 are used to compare two different sets of signals as will be described in detail subsequently in the present disclosure. The comparators 34, 35, and 36 are used to compare various input signals such as at 31, 32, and 33 along with three constants C1, C2, and C3. The constant C1 is compared against the input 31 in the comparator 34, while the constant C2 is compared against the inputs 32 and 33 in both the comparators 35 and 36. The constant C2 has inputs to the comparators 35 and 36 at 40 and 41. The constant C3 has inputs to the comparators 35 and 36 at 42 and at 43. The constant C3 is also supplied as an input by conductor 44 to a summing means 45.

In connection with the summing device 34, it will be noted that the input signal D on conductor 31 is compared against the constant C1 and the switch disclosed in the comparator 34 closes in the event that the difference D is less than the constant C1. Conventional notation for the comparison of the difference signal D against the constants C1, C2, C3 and a further signal CE is disclosed in the comparators 34, 35, and 36. It will be understood that the switches shown in the comparators 34, 35, and 36 will close when the appropriate comparisons have been made as indicated in each of the blocks and these comparisons will be discussed in more detail when the overall system has been described in detail.

The comparator means 25 has two additional summing means disclosed at 46 and 47. The summing means 46 receives the difference signal D and has an output conductor 50 that acts as an input at 51 and at 52 to the comparators 34 and 35. The summing means 46 has an input conductor 53 which is connected elsewhere in the circuit, as will be described subsequently. The summing means 47 has one input connected to the conductor 30 which provides the difference signal D to the summing means 47. The summing means 47 also receives a further signal on a conductor 54 from elsewhere in the circuit, and the summation provided by the summing means 47 has been identified as an error signal CE. The output of the summing means 47, that is the error signal CE, is provided by the conductor 55 that acts as inputs at 56 and at 57 to the two comparators 35 and 36.

The comparator 34 has an output at 58, the comparator 35 has an output at 59, and the comparator 36 has an output at 60. The outputs 58, 59, and 60 are connected into a single conductor 61 which is used to reset or reinitiate a portion of the circuit (that has not yet been described) based on the comparisons of the signals as indicated in the various comparators 34, 35, and 36. At this point it is sufficient to understand that each of the comparators 34, 35, and 36 function so that only one of the comparators will have a completed or closed circuit through it to provide a signal on conductor 61 at any interval of time. The comparisons take place when changes occur in the setpoint Tsp of a sufficient magnitude so that one of the comparators 34, 35, or 36 functions to complete a circuit thereby providing a signal on conductor 61 to reinitiate or shift the operating point of a portion of the circuit that has not yet been described in detail. That circuit portion will now be identified.

A signal processing means 70 is provided to receive an input from conductor 16 indicating any current error in the signal between the temperature being sensed Ts and the setpoint Tsp. The signal on conductor 16 is supplied to the signal processing means 70 where it enters an integrating means 71 that has its input 72 connected to the conductor 16. The integrator means 71 further has an input 73 from a signal source 74 that initiates the point of integration of the integrating means 71, and which can be shifted by the signal from the conductor 61 to reinitiate the integrator means 71. This reinitiation of the integrator means 71 also will be referred to as the integrator means being initiated with a stored integral value and having an input so that the integrator means is capable of being reinitiated from its initial stored integral value to a new integral value supplied from conductor 61. The integrator means 71 has an output at 75 which is an integral reset output means for the integrator means 71. The output 75 is connected by conductor 76 to a further previous integral reset output signal means 77 that has been disclosed as a zero order hold circuit. The zero order hold circuit 77 has an output at 78 which is the value of the integrator means 71 at an interval of time just prior to the present interval of time. The output on the conductor 78 is supplied to a summing means 80 which has the output conductor 54 which has been previously discussed as an input to the summing means 47 where the error signal CE is generated.

The signal processing means 70 is completed by a proportional constant means 81 which is connected by conductor 82 to the conductor 16 and which has an output 83 which is proportional to the input on conductor 82. In the present system the proportional constant means 81 can be considered as an amplifier with a gain of one. The gain can be of any magnitude, but is disclosed as a gain of one for simplicity sake. The output 83 is connected to three conductors 84, 85, and 86. The conductor 84 supplies the proportional output 83 to the summing means 45 which acts as an input at 48 to the comparator 36. The output of the proportional constant means 81 on conductor 85 is supplied to the summing means 90 and provides a summed output on the conductor 54. The output of the proportional constant means 81 at conductor 86 is supplied to a further summing means 90 which sums the output 75 from the integrator means 71 and provides an output on conductor 91 which is a continuous composite error signal. The composite error signal on conductor 91 is a key control signal within the thermostat means 10. To complete the interrelationship of the circuitry between the signal processing means 70 and the comparator means 25, there is the conductor 53 which provides a signal from the zero order hold or previous integral reset output means 77 to the summing means 46 where it is compared with the difference signal D and connects to the inputs at 51 and 52 to the comparators 34 and 35 of the comparator means 25.

To this point in the description, a portion of the thermostat means 10 has been described which is capable of comparing the setpoint temperature Tsp and the temperature being sensed Ts, and manipulating those values to provide a continuous composite error signal on conductor 91 which will provide the necessary and desired control of the heating plant that is operated by the thermostat means 10. The thermostat means 10 is completed by connecting the conductor 91 to a summing means 100 that acts as an input to a multistage cycling means generally disclosed at 101. The multistage cycling means 101 has as many independent stages as there are stages in the primary heating means and the secondary heating means taken together. Each of the stages are disclosed separately and are identified as stage 102, 103, and 104. Each of the stages 102, 103, and 104 have a hysteresis loop function and this will be more readily understood in connection with the description when considered with a graph of FIG. 2. As the continuous composite error signal on conductor 91 is summed into the summing means 100, it drives an input at 105 for the stage 102, at 106 for the stage 103, and at 107 for the stage 104. Each of the hysteresis loops within the individual stages 102, 103, and 104 are offset from one another so that the functioning from an "off" state to an "on" state for each individual stage does not overlap. The individual multistage cycling means components 102, 103, and 104 can be designed using any type of electronics. These merely are stages of off-on control which have a conventional hysteresis type loop from the "off" to the "on" states, and each of the stages are offset from one another, as will be disclosed in FIG. 2.

The stage 102 has an output at 108, the stage 103 has an output at 109, and the stage 104 has an output at 110. All of these outputs are summed together at 111 and form an output for the thermostat means 10 at 112. The output 112 drives the various stages of the primary heating means and the secondary heating means as will be apparent in connection with FIG. 2. To complete the disclosure of the multistage cycler means 101, a heat anticipator 113 is connected between the output 112 and the summing means 100. This is an optional feature and is normally used in the thermostat art. The heat anticipator 113 provides heat or electronic signal representation of heat whenever any of the stages 102, 103, or 104 are in an "on" state and this heat can be applied to the temperature sensor or cycler which supplies the signal to the temperature sensing means Ts. This allows for the system to anticipate the termination of a need of the heating plant so that the system has a reduction in its tendency to overshoot in satisfying the control of an ambient.

Figure 2:
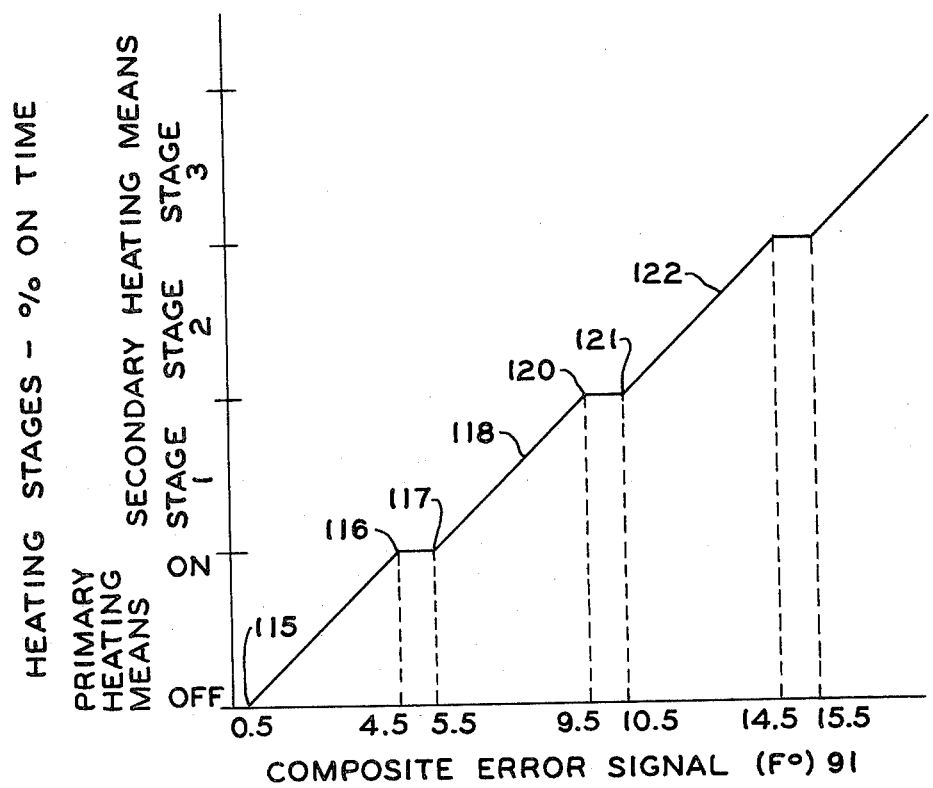
FIG. 2 is a graph of a multistage cycler used for control.

Before any attempt is made to describe the operation of the thermostat means 10, the graph of FIG. 2 should be considered. The graph of FIG. 2 is a graph of the function of the cycler means 101 wherein a composite error signal in degrees Fahrenheit as provided on conductor 91 versus the percent on time of the primary and secondary heating stages or heating plant means. The curve of FIG. 2 starts at approximately one half degree of composite error signal at 115 where the primary heating means or heat pump is in an "off" state. As the composite error signal 91 increases to 4.5 degrees the curve increases to point 116 at which time the primary heating means or heat pump is in a full "on" condition. That is, the heat pump is on 100 percent of the time. If the composite error signal 91 continues to increase by more than one degree to point 117, the curve of the composite error signal 91 versus the heating stages increases as at 118. This brings "on" the first stage of electric heat. The percent on time for the first stage of electric heat continues until the composite error signal 91 reaches an error signal equal to 9.5 degrees Fahrenheit at 120 where an interstage differential of one degree again occurs. If a further one degree in differential of composite error signal 91 occurs so that the curve reaches 121, the next stage of electric heat comes "on" as shown by the curve at 122. This continues on with as many stages of electric heat as are present and the first three stages described in connection with FIG. 2 agree with the disclosure of the stages 102, 103, and 104 of the multistage cycler means 101. It is apparent that as the signal on conductor 91 continues to increase in value the inputs to the stages 102, 103, and 104 continue to move up along the curve as disclosed in FIG. 2 thereby bringing on the heat pump, stage one, stage two, and stage three, etc. as is needed for any particular installation. It is thus apparent that by providing a continuously increasing composite error signal 91 to the summing means 100 that any number of desired stages can be controlled in an off-on fashion to provide a multistage thermostat 10 that is capable of operating a heating plant having both a primary heating means and a plurality of secondary heating means.

Figure 3:
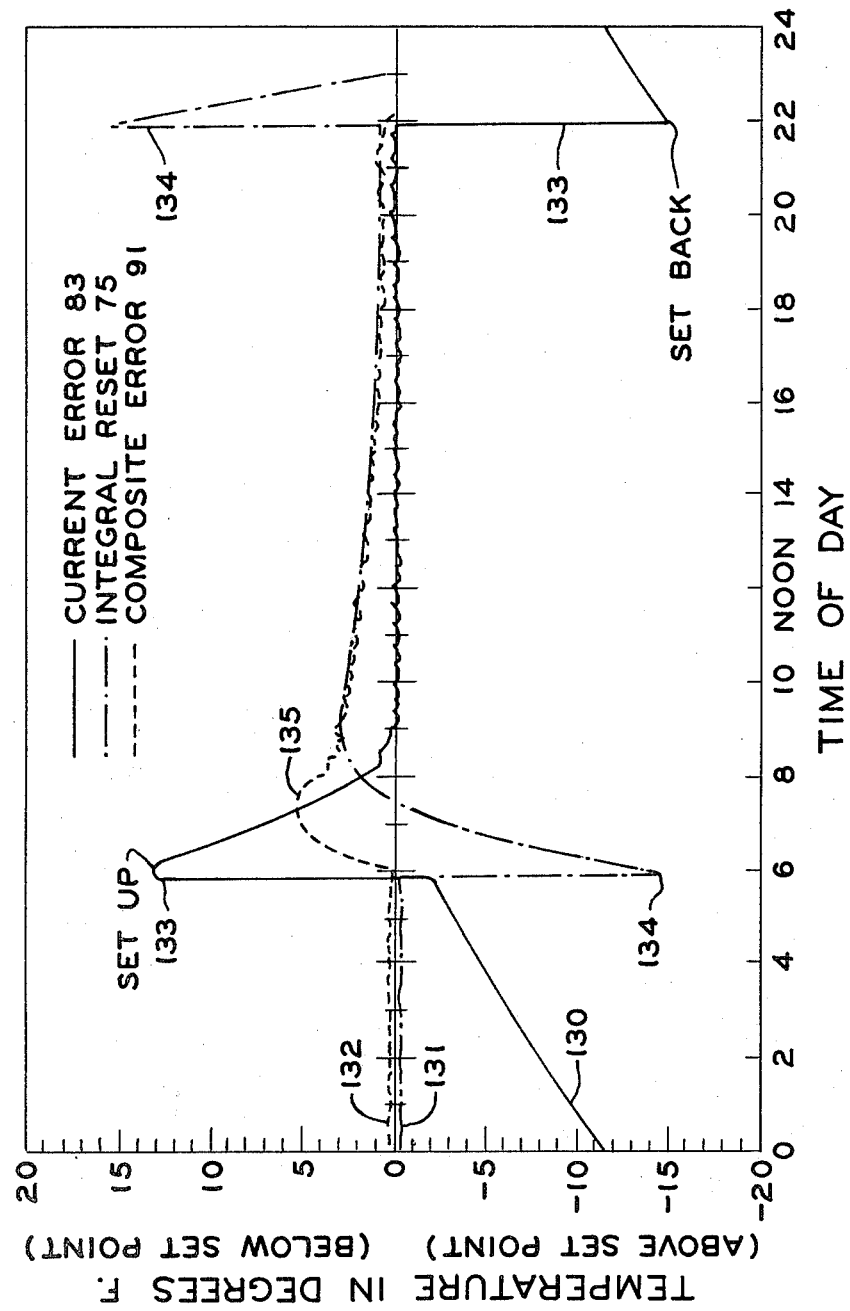
FIGS. 3 and 4 are a pair of graphs of time of day versus temperature for two different outdoor temperature control situations.
Figure 4:
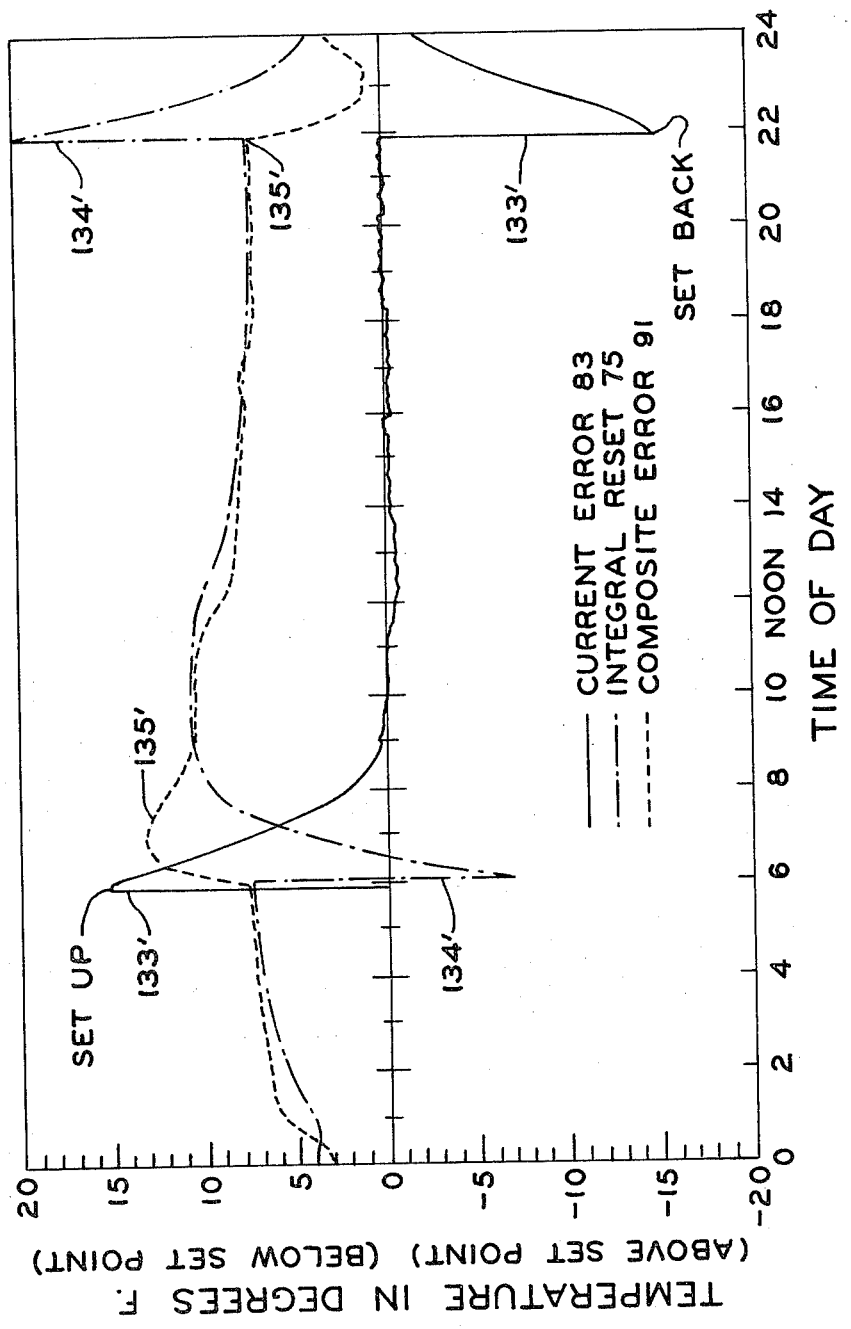

The operation of the multistage thermostat means 10 disclosed in FIGS. 1 and 2 can best be understood by considering specific examples. In order to provide this type of an explanation FIGS. 3 and 4 have been provided which are graphs of temperature in degrees Fahrenheit versus the time of day for two different sets of circumstances. In FIG. 3 the graph discloses the operation of a system with a mild outdoor temperature, a 15 degree setup in the morning, and a 15 degree setback at night. FIG. 4 is a similar graph in which a morning setup of 15 degrees and a night setback of 15 degrees are provided, but with a much colder exterior temperature against which the heating plant must control the interior temperature.

In considering the graph of FIG. 3 three different signals contained in the thermostat means 10 have been disclosed. The first signal is the current error signal occurring on conductor 83 which is obtained from the first summing means 15 by comparing the temperature at the setpoint means Tsp and the temperature being sensed by the temperature sensing means Ts. The second curve of interest is the integral reset signal at integrator output 75 which is an integration of the signal on conductor 16 from the summing means 15. The third curve disclosed for consideration is the composite error signal that continuously is supplied on conductor 91 that is a summation at the summing means 90.

If the first example considered is that of FIG. 3, the time at midnight will first be considered and is referenced as time zero. It will be noted that the current error signal 83 at point 130 is slowly drifting towards the zero reference of temperature in degrees above or below the setpoint. Since the system has been working in a night setback environment with a mild outdoor temperature, the ambient is slowly drifting with the setpoint Tsp somewhere above the point at which control is desired. During this same period of time, the integral reset signal 75, as disclosed at 131, and the composite error signal on conductor 91, as disclosed at 132, are substantially zero in magnitude.

At 6:00 in the morning a setup of 15 degrees occurs as is shown at 133 by the current error 83 suddenly changing to indicate that a signal below the setpoint is being sensed by sensor Ts. Now with reference to FIG. 1, it will be noted that if a sudden change in the setpoint Tsp occurs that the summing means 23 receives a 15 degree error at the output 24. This is accomplished by the zero order hold circuit 20 providing a signal that is representative of the magnitude of the temperature of the setpoint at an interval of time prior to the change, while the signal from the setpoint means Tsp has been shifted by 15 degrees. By making this comparison, the summing means 23 provides an error signal of 15 degrees which is inverted and supplied on conductor 30 as a negative 15 degree difference in setpoint. This signal is then immediately compared by the comparators 34, 35, and 36 of comparator means 25. The constant C1 has been selected as a negative 1, the constant C2 as a positive 1, and the constant C3 as a positive 5.5 degrees. As such, the input of the comparator means 35 and 36 each are less than the constant C2 and the first stage switch of the comparator means 35 and 36 remain open. Those two comparators do not provide any type of an output change on conductor 61 to the integral reset output means 61 to shift the integrator means 71 in its operation. At this same time a −15 is supplied on conductor 30 to the comparator 34 where it is compared with the constant C1 which is a −1. Since the input 31 is at −15, it is below the −1 constant C1 and the switch shown for comparator 34 immediately closes applying a 15 degree shift to the conductor 61 where the integral reset 74 resets the condition of the integrator 71. In FIG. 3 this is represented by the sudden drop of the integral reset output 75 as disclosed at 134. This drop is 15 degrees and corresponds with the 15 degree setup as shown at 133.

At the time that the shift takes place for the setup, the zero order hold circuit 77 retains the previous integral which is approximately zero. The reason that it is zero is that the system had no change from the previous interval of time and therefore the integrator (as shown at 131) is near zero degrees. This is the reason that the summed value at the summing means 46 is approximately −15 which is what the comparator 34 supplies to the integrator means 71 to shift the integration by 15 degrees.

It will be noted that the sudden shift of the integral reset 75 at the same time that the setup temperature of 15 degrees occurs causes the composite error signal 91 at 135 to remain quite low. As a matter of fact, in a properly designed system the signal 135 will not exceed a 5 degree composite error signal thereby turning "on" only the heat pump. If reference is made to FIG. 2 it will be noted that if the signal of the composite error 91 (as shown at 135 in FIG. 3) does not exceed 5.5 degrees, the heat pump alone will be operative and no electric heat will be brought into operation. The reset of the integral prevents the unnecessary operation of the electric heat, which is the desired function provided by the thermostat means 10. Since the outdoor ambient is relatively mild, the heat pump alone is capable of bringing the system back to a control point, as is shown by the current error signal 83 returning to the zero level at approximately 9:00 in the morning. The operation of the system during the balance of the day allows for the integral reset output 75 and the composite error signal 91 to remain very close to one another, and thereby causes the composite error signal 91 to operate only the heat pump until 10:00 at night.

At 10:00 at night a 15 degree setback is set into the system as is exemplified by a change at that time in curve 133. Once again the comparator means makes a comparison of the change and compares it with the status at the previous interval of time. This allows for the integrator 71 to be shifted as is shown at 134. Under these conditions the integrator output 75 is at approximately one degree immediately after the night setback, while the difference D becomes a positive 15 degrees. In the comparator 35 the input 32 is at 15 degrees and is compared to the constant of +1. Sine the difference signal D is more than the stored constant C2, the first stage switch of the comparator 35 closes. At this same time, the zero order hold means 77 is providing the summing means 80 with a +1 while the current error on conductor 83 is supplying a −15 degrees. The summing at 80 provides a value of approximately a −14 degrees on the conductor 54. This is summed with a positive 15 degrees on the conductor 30 into the summing means 47 where the error CE becomes a +1. That +1 is supplied at input 57 to the second portion of the comparator 35. That is compared with the constant 5.5 and since it is less than or equal to the constant C3, the second switch will close thereby applying the signal on the input 52 to the output conductor 61 to reset the integrator at 74 as has been disclosed at the 10:00 in the evening by curve 134. This sudden shift allows for all of the heating plant to be shut down, that is both the heat pump and the auxiliary heat. Since the outdoor temperature is assumed to be quite mild this is a satisfactory form of operation.

In FIG. 4 a similar set of curves to that disclosed in FIG. 3 is provided. In FIG. 4 the difference is that the outdoor temperature is sufficiently cold as to require the heat pump and some electric heat to be operative even during the night setback operation. It will be noted that at about 6:00 in the morning when the setup occurs at 133', the integrator output 75 as shown by 134' again is inverted and that the composite error signal 91 at 135' has the same shape as that in FIG. 3. It will be noted, however, that it is shifted in an upward direction so that the composite error signal 91 is in the range of 10 to 15 degrees thereby requiring not only that the heat pump be operated but that some stages of electric heat be added in order to bring the current error output 83 back to approximately zero at near 9:00 in the morning. Although the current error does not reach 0 until about 9:00, the house reaches the setpoint at about 8:00. This is due to unavoidable sensor lag which is compensated for by the anticipation means.

If FIG. 4 is further considered at the setback time of 10:00 at night, it will be noted that the current error 83 as disclosed by curve 133' is offset once again from the curve 134' which is the integral reset output 75. Since the curve 134' has been offset with respect to the zero reference, it will be noted that the composite error curve 135' at 10:00 in the evening is above the 5.5 degree point thereby indicating that the heat pump must be kept "on" as well as possibly some electric heat. The curve 135' representing the composite error on conductor 91 never drops to a point that would allow the heat pump to be turned "off" thereby causing the heat pump to run continuously even though the initial night setback at 10:00 would have otherwise turned "off" both the heat pump and all of the auxiliary heat. This is a desirable state of operation for a heat pump as in very cold weather since it is detrimental to the equipment to allow the heat pump to be turned "off" and then restarted under very cold conditions.

The disclosure provided is a preferred implementation of a multistage thermostat 10 that is capable of operating a heating plant that has primary and secondary heating means and which is capable of operating this equipment in a more efficient manner then would be available under normal conditions. The present invention takes into consideration the outside ambient temperature and allows for the proper readjustment of the equipment to operate it in the most efficient manner, but accomplishes this without the need to sense any outdoor ambient directly. The sensing accomplished in the present system is by means of sampling the previous temperature setpoints and errors within the system at an interval of time prior to the present interval of time, and then making a control judgment based on the degree of change involved. The amount of change that causes the system to operate properly can be selected by the selection of the constants used in the comparator means 25 and by the type of staging that is used in the multistage cycler means 101 that acts as the output switching control for the thermostat means 10. By properly selecting the circuit parameters, the constants, the temperature difference between the composite error signals of the various stages, and the presence of an anticipator, a complete temperature control system that would efficiently operate a heat pump and auxiliary heat has been disclosed in detail. This system is capable of being modified to be applicable to any type of heating system that uses a primary heating means and secondary heating means. These types of heating systems would be heat pumps combined with gas furnaces, modulated gas equipment, or a combination of solar energy equipment and auxiliary heat. In view of the fact that the present invention can be obviously modified to suit different types of heating installations and circumstances, the disclosure of the invention could be modified by anyone skilled in this art. As such, the appended claims constitute the sole limitation as to the scope of the present invention.

The embodiments of the invention in which an exclusive property or right is claimed are defined as follows:

1. A multistage thermostat adapted to operate a heating plant having primary heating means and secondary heating means, including: temperature sensing means having an output signal responsive to an ambient temperature to be controlled by the operation of said heating plant; variable temperature setpoint means having an output signal to set said thermostat to control said ambient temperature by the operation of said heating plant; clock means to provide a continuous series of timed intervals; first summing means having inputs connected to receive said sensing means signal and to receive said setpoint means signal with said summing means including output means having a signal representative of a current temperature error; previous temperature setpoint means having an output signal equal to said setpoint output signal at an interval of time prior to a current interval of time; second summing means having inputs connected to receive said two setpoint output signals to provide a difference output signal from said two setpoint means for each successive interval of time; signal processing means including integrator means being initiated with a stored integral value and having an integral reset output means, and further having previous integral reset output means; said signal processing means further including proportional constant means having an output proportional to its input; said signal processing means having an input connected to said first summing means to receive said current temperature error signal; said signal processing means having output means providing a continuous composite error signal, a previous integral reset output signal, and a current error output signal; comparator means having input means connected to compare said output signals from said second summing means, said previous integral reset output means, and said current error output signal from said signal processing means; said comparator means having output means connected to said integrator means to reinitiate the stored integral value of said integrator means upon said comparator means measuring a predetermined level of change between said temperature setpoint output signal and said temperature sensing means output signal; and multistage cycler means having input and output means; said multistage cycler input means connected to receive said continuous composite error signal; said cycler output means adapted to be connected to said heating plant and having a staged output signal responsive to said continuous composite error signal from said signal processing means to progressively stage said primary heating means and said secondary heating means of said heating plant.

2. A multistage thermostat as described in claim 1 wherein said previous temperature setpoint means includes zero order hold means to establish said output signal equal to said setpoint signal at an interval of time prior to said current interval of time.

3. A multistage thermostat as described in claim 1 wherein said clock means is connected to said variable temperature setpoint means to adjust said temperature setpoint means output signal as a function of time.

4. A multistage thermostat as described in claim 3 wherein said comparator means includes at least one stored constant against which said output signals from said second summing means, said previous integral reset output means, and said current error output means are compared.

5. A multistage thermostat as described in claim 4 wherein said clock means adjusts said variable temperature setpoint output signals in setup and setback functions as determined by said clock means; and said comparator means includes a plurality of stored constants operating upon said setup and setback functions by comparison with said plurality of stored constants to cause said heating plant to operate in response to said variable temperature setpoint output signal changes as programmed by said clock means.

6. A multistage thermostat as described in claim 5 wherein said comparator means has three stored constants; a first stored constant is compared to said setpoint output signal on setup of said setpoint output signal to control the energization of said heating plant; and a second and a third stored constants being compared to said setpoint output signal on setback of said setpoint output signal to control the deenergization of said heating plant.

7. A multistage thermostat as described in claim 6 wherein said multistage cycler means includes a cycler stage for operation of each stage of said heating means with said stages being separated in operation by a temperature differential; said cycler stages each having a hysteresis like function.

8. A multistage thermostat as described in claim 7 wherein said multistage cycler means includes heat anticipation means connected to generate heat to anticipate the operation of said heating plant with said heat applied to said temperature sensing means.

9. A multistage thermostat as described in claim 6 wherein said previous integral reset output means includes zero order hold means to provide said means with a previous integral reset output signal.

10. A multistage thermostat as described in claim 6 wherein said first and said second stored constants each equal numerically the number of degrees of temperature between output stages of said multistage cycler means, and said third stored constant at least equals numerically the number of degrees of temperature between similar points in adjacent output stages of said multistage cycler means.

* * * * *